United States Patent
Petty et al.

(10) Patent No.: US 11,818,288 B2
(45) Date of Patent: *Nov. 14, 2023

(54) METHOD, SYSTEM, AND COMPUTER PROGRAM PRODUCT FOR ACCESSING DATA ABOUT A CALLER FROM MULTIPLE DATA SOURCES IN REAL TIME

(71) Applicant: Mission Critical Partners, LLC, Port Matilda, PA (US)

(72) Inventors: Sean Petty, Downingtown, PA (US); John Chiaramonte, Leesburg, VA (US); Dave Sehnert, Lafayette, CO (US)

(73) Assignee: Mission Critical Partners, LLC, Port Matilda, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/975,748

(22) Filed: Oct. 28, 2022

(65) Prior Publication Data
US 2023/0049790 A1    Feb. 16, 2023

Related U.S. Application Data

(63) Continuation of application No. 16/811,722, filed on Mar. 6, 2020, now Pat. No. 11,503,152.
(Continued)

(51) Int. Cl.
*H04M 3/00* (2006.01)
*H04M 5/00* (2006.01)
(Continued)

(52) U.S. Cl.
CPC .... *H04M 3/42059* (2013.01); *H04M 3/42042* (2013.01); *H04M 3/436* (2013.01); *H04M 3/523* (2013.01); *H04M 2242/22* (2013.01)

(58) Field of Classification Search
CPC .............. H04M 3/5116; H04M 11/04; H04M 2242/04; H04M 7/006; H04M 2242/30;
(Continued)

(56) References Cited

U.S. PATENT DOCUMENTS

| | | | |
|---|---|---|---|
| 10,264,122 B1 | 4/2019 | Jensen | |
| 2005/0141692 A1* | 6/2005 | Scherer | H04M 3/42314 379/265.02 |

(Continued)

*Primary Examiner* — Kharye Pope
(74) *Attorney, Agent, or Firm* — The Webb Law Firm

(57) ABSTRACT

Described are a method, system, and computer program product for accessing data about a caller from multiple data sources in real time. The method includes communicatively connecting with call handling equipment and receiving caller data including a unique caller identifier. The method also includes communicating a request for initial information to a location information database and/or an additional data repository. The method further includes reconfiguring the initial information from an inbound format to a different outbound format such that the initial information is readable by the call handling equipment, a computer aided dispatch system, and/or a public safety information management system. The method further includes communicating a request for and receiving additional information from a cloud-based repository. The method further includes communicating the additional information to the call handling equipment, the computer aided dispatch system, and/or the public safety information management system for display to a user.

20 Claims, 8 Drawing Sheets

Related U.S. Application Data

(60) Provisional application No. 62/815,751, filed on Mar. 8, 2019.

(51) Int. Cl.
*H04L 12/66* (2006.01)
*H04M 3/42* (2006.01)
*H04M 3/523* (2006.01)
*H04M 3/436* (2006.01)

(58) Field of Classification Search
CPC ............. H04M 7/0075; H04M 7/1205; H04M 3/42357; H04M 3/42059; H04M 3/42348; H04M 11/00; H04M 3/5183; H04M 3/42042; G08B 25/006; G08B 21/02; G08B 25/016; G08B 25/14; G08B 27/001; H04W 4/90; H04W 4/029; H04W 76/50; H04W 4/02; H04W 4/021; H04W 4/14
USPC ......... 379/45, 201.01, 37; 455/404.1, 404.2; 370/352
See application file for complete search history.

(56) References Cited

U.S. PATENT DOCUMENTS

| | | | |
|---|---|---|---|
| 2008/0188198 A1* | 8/2008 | Patel ................... | G06F 21/6245 455/404.2 |
| 2009/0075703 A1* | 3/2009 | Furbeck ................. | H04M 11/04 455/569.2 |
| 2009/0100165 A1* | 4/2009 | Wesley, Sr. ............ | H04L 67/34 709/223 |
| 2009/0172131 A1 | 7/2009 | Sullivan | |
| 2010/0261492 A1* | 10/2010 | Salafia ............... | H04N 1/00212 455/466 |
| 2010/0262668 A1* | 10/2010 | Piett ........................ | H04W 4/90 709/219 |
| 2011/0105076 A1 | 5/2011 | Bot | |
| 2012/0066175 A1* | 3/2012 | Pickering ................ | G06F 16/31 707/E17.044 |
| 2013/0077766 A1* | 3/2013 | Keller ................. | H04M 3/5237 379/45 |
| 2014/0167954 A1 | 6/2014 | Johnson et al. | |
| 2014/0243036 A1 | 8/2014 | Kouwe | |
| 2018/0171683 A1* | 6/2018 | Lange .................... | E05B 77/30 |
| 2019/0149661 A1* | 5/2019 | Klaban ................ | H04M 7/0075 379/45 |
| 2019/0174289 A1* | 6/2019 | Martin .................... | H04W 4/90 |
| 2019/0320310 A1* | 10/2019 | Horelik .................. | H04W 4/90 |
| 2020/0059776 A1* | 2/2020 | Martin ................ | G06F 3/04817 |
| 2020/0314623 A1 | 10/2020 | Pellegrini et al. | |

* cited by examiner

METHOD, SYSTEM, AND COMPUTER PROGRAM PRODUCT FOR ACCESSING DATA ABOUT A CALLER FROM MULTIPLE DATA SOURCES IN REAL TIME

CROSS-REFERENCE TO RELATED APPLICATIONS

This application is a continuation of U.S. patent application Ser. No. 16/811,722, filed Mar. 6, 2020, which claims the benefit of U.S. Provisional Patent Application No. 62/815,751, titled "Public Safety Data Router" and filed Mar. 8, 2019, which are incorporated by reference herein in their entireties.

BACKGROUND

Field of the Disclosure

The present disclosure is related to emergency communication and response networks, and in some particular non-limiting embodiments, to systems, methods, and computer program products for accessing data about a caller from multiple data sources in real time, and reconfiguring data from new sources for accessibility to previously unconfigured emergency systems.

Description of Related Art

Emergency communication or response systems, e.g., legacy 9-1-1 systems, are not able to easily, if at all, connect, read, receive, display, and/or process data from newer data sources, e.g., accessed through FirstNet. These problems cause delays in the processing and responding to emergency calls initiated with the emergency response systems. It also causes lost time and increased costs in an attempt to retrofit legacy systems to accept information from new data sources or even to connect to FirstNet.

Since the inception of 9-1-1, the quantity and quality of data delivered to a 9-1-1 telecommunicator has largely remained the same. With traditional landline telephones, only basic location information has been available and mobile phones have presented an even greater challenge to locate accurately.

In recent years, new sources of advanced information have become available to 9-1-1 centers. These repositories offer precise location information as well as additional detailed information about the caller or the emergency situation. Additionally, cloud-based artificial intelligence applications have become more widely available.

9-1-1 telecommunicators utilize call handling equipment (CHE) and computer aided dispatch (CAD) systems to receive and process emergency events. This equipment is provided by many different vendors and varying levels of interpretation and/or implementation of standards, which results in inconsistencies in how each company implements its solution. This creates a roadblock to rapid evolution and integration of new data sources. Another major roadblock that prevents universal and rapid adoption of new sources of data are the limitations and restrictions placed on these public safety computer networks due to governance issues, local policies, or other restrictions.

There is a need in the art for a technical solution of connecting emergency communication and response systems, e.g., legacy systems, to new data sources, and requesting, receiving, processing, and reconfiguring the data such that it is able to be processed by the emergency communication and response systems. There is a further need to dramatically reduce the length of time between the introduction of a new source of data and its introduction into the daily operations of a 9-1-1 center.

SUMMARY

The methods and systems described herein solve the limitations of rapidly providing additional data and capabilities to Public Safety Answering Points (PSAPs) utilizing existing hardware and software without costly and time-consuming migrations or upgrades.

FirstNet, a public safety broadband network, was created in 2012 and began operation in 2017. FirstNet offers a ubiquitous, nationwide, broadband wireless network for public safety agencies. Public safety networks offer the ability to remove many of the traditional networking barriers that exist today in public safety communication centers, which would also enable a mechanism to rapidly deliver new sources of data to the 9-1-1 telecommunicator.

An embodiment of this disclosure is directed to a hardware appliance that is installed at a PSAP. It may feature several methods to integrate to existing systems in the PSAP, including pass-through connections to the call handling equipment (CHE), serial automatic location identification (ALI) links, Ethernet connections for integration to local computer aided dispatch (CAD) systems, call handling equipment, voice and data recording equipment, radio equipment, and others.

The device may include an embedded transceiver to provide connectivity to a public safety network (e.g., FirstNet). This transceiver can enable immediate, highly-secure "out-of-the-box" communication with a cloud-based virtual data routing service. An embedded module may remove many of the existing roadblocks to rapid integration by establishing the PSAP immediately on the nationwide network and allowing immediate communication not only to any other connected PSAP, but to approved third party sources of data that also exist on the network.

An embodiment of this disclosure, in another aspect, features a computer program product tangibly embodied in a non-transitory computer readable storage device for establishing an individually-identifiable endpoint for every connected PSAP to enable rapid routing of messages. The computer program product includes instructions operable to establish a secure connection with a computing device at the data repository.

The computing product at the data repository maintains awareness of the connected status of all participating PSAPs. When the computing product at the data repository receives a message for a participating PSAP, it routes the message or communication to the appropriate endpoint or returns a message to the sender that the remote site is not available.

The invention features integrations with existing systems in the 9-1-1 center without the need for additional software or minimal modifications. One such integration is to supplement the existing CHE systems ALI links to provide highly-accurate location data. In this integration, the invention is placed between (in-line) the traditional legacy source of caller and location information (ALI) link to the call processing equipment. The invention monitors requests for legacy location information that originate from the CHE. When a request is observed, the invention polls sources of advanced location information via the embedded transceiver. If additional information is available for the 9-1-1 caller, the invention provides this data to the CHE in the legacy format it expects.

Another such integration is the provision of automated alarm data to the local CAD system from national alarm monitoring providers. In the current landscape, a PSAP must complete complex interconnections to their state's message-switched infrastructure, if their state participates in the program, and completes complicated integrations with the CAD system vendor. This process is often very time-consuming and is not supported by all of the United States.

Embodiments of this disclosure solve this problem by creating a persistent, addressable endpoint to receive automated alarm messages utilizing standard protocols. The invention eliminates the need for the PSAP's state to participate in the program by providing a consistent, predictable, and always-on connection via the embedded transceiver and public safety network (e.g., FirstNet). The invention dramatically reduces the time necessary to integrate this additional source of information, yet the invention utilizes standards-based protocols.

According to a non-limiting embodiment, provided is a computer-implemented method of accessing data about a caller from multiple data sources in real time. The method includes (a.) communicatively connecting, by a public safety data router (PSDR), with call handling equipment. The method also includes (b.) in response to a communication being initiated by a caller, receiving, at the PSDR, caller data including a unique caller identifier associated with the caller from the call handling equipment. The method further includes (c.) communicating, by the PSDR based on the unique caller identifier, a request for initial information to a location information database and/or an additional data repository. The method further includes (d.) receiving, by the PSDR, the initial information, and (e.) reconfiguring, by the PSDR, the initial information from an inbound format to a different outbound format such that the initial information is readable by at least one of the call handling equipment, a computer aided dispatch system, and a public safety information management system. The method further includes (f.) communicating, by the PSDR, the initial information to at least one of the call handling equipment, the computer aided dispatch system, and the public safety information management system. The method further includes (g.) communicating, by the PSDR based on an index or search criteria, a request for additional information to a cloud-based repository. The method further includes (h.) receiving, by the public safety router, the additional information from the cloud-based repository. The method further includes (i.) communicating, by the PSDR, the additional information to at least one of the call handling equipment, the computer aided dispatch system, and the public safety information management system for display to a user.

In further non-limiting embodiments, the method may include, before step (a.), connecting, by the PSDR, to the cloud-based repository. A connection between the PSDR and the cloud-based repository may be executed through a public safety agency network. The method may include, before step (a.), requesting, by the PSDR through the public safety agency network, configuration data from a cloud-based management platform of the cloud-based repository. The method may include, before step (a.), receiving, by the PSDR, the configuration data and configuring, by the PSDR based on the configuration data, communication settings of the PSDR to allow the PSDR to freely download data from and upload data to the cloud-based repository.

In further non-limiting embodiments, the PSDR may directly communicate the initial information and the additional information to the computer aided dispatch system.

In further non-limiting embodiments, the method may further include directly communicating, by the PSDR, with a logging system and inputting, by the PSDR, data into the logging system from at least one of the call handling equipment, the computer aided dispatch system, and the cloud-based repository.

In further non-limiting embodiments, the PSDR may directly communicate with an automatic location identification provider, the location information database, or the additional data repository to receive at least a portion of the initial information.

In further non-limiting embodiments, the method may include receiving, by the PSDR with a link to an automatic location information (ALI) modem, an automatic number identification, a pseudo-automatic number identification, or other unique identification tag. The method may include relating, by the PSDR between step (b.) and step (c.), the automatic number identification, the pseudo-automatic number identification, or the other unique identification tag to the caller data. The method may include communicating, by the PSDR, the automatic number identification, the pseudo-automatic number identification, or the other unique identification tag to the call handling equipment.

In further non-limiting embodiments, the method may include receiving, by the PSDR, a request for location data from the call handling equipment. The request for the location data may include the automatic number identification, the pseudo-automatic number identification, or the other unique identification tag.

In further non-limiting embodiments, the method may include translating, by the PSDR, data from at least one of the additional data repository, the location information database, and the cloud-based repository such that the call handling equipment, computer aided dispatch system, and logging system can read the translated data.

In further non-limiting embodiments, in response to the call handling equipment requesting the location data by sending the automatic number identification to the PSDR, the PSDR may request the location data from the ALI modem and the cloud-based repository. Further, (i.) in response to the PSDR not receiving the location data from the cloud-based repository within a predetermined period of time, the PSDR may send the location data received from the ALI modem to the call handling equipment. Moreover, (ii.) in response to the PSDR receiving the location data from the cloud-based repository before receiving the location data from the ALI modem, the PSDR may send the location data from the cloud-based repository and prepare queued location data from the ALI modem. The call handling equipment may request the queued location data from the PSDR after step (ii.). The PSDR may send the queued location data to the call handling equipment.

In further non-limiting embodiments, in response to the call handling equipment requesting the location data by sending the pseudo-automatic number identification to the PSDR, the PSDR may request the location data from the ALI modem and the cloud-based repository. The PSDR may send the location data received from the ALI modem to the call handling equipment. The PSDR may prepare queued location data from the cloud-based repository. The call handling equipment may request the queued location data from the PSDR. The PSDR may send the queued location data to the call handling equipment.

In further non-limiting embodiments, the method may include, in response to the cloud-based repository receiving alarm data from a third party alarm monitoring system, receiving, by the PSDR, the alarm data from the cloud-based repository, and communicating, by the PSDR, the alarm data to the computer aided dispatch system. The method may also include establishing, by the PSDR, a two-way communication channel between a dispatcher and the third party alarm monitoring system.

In further non-limiting embodiments, the cloud-based repository may be programmed and/or configured to communicate with a plurality of PSDRs including the PSDR.

In further non-limiting embodiments, the caller may initiate communication with the call handling equipment as a video call, a voice call, a text message, an email, or other electronic communication.

According to a non-limiting embodiment, provided is a system for accessing data about a caller from multiple data sources in real time. The system includes a computer aided dispatch system. The system also includes a logging system. The system further includes a public safety data router (PSDR) programmed and/or configured to request initial information from an automatic location information (ALI) modem, causing the ALI modem to access the initial information from a location information database. The PSDR is also programmed and/or configured to receive the initial information from the ALI modem. The PSDR receives and reconfigures the initial information from an inbound format to a different outbound format such that the data is readable to call handling equipment. The PSDR is further programmed and/or configured to, in response to the ALI modem receiving the initial information from the location information database and/or the additional data repository, communicate the initial information to the call handling equipment. The PSDR is further programmed and/or configured to request additional information from a cloud-based repository. The PSDR is further programmed and/or configured to receive the additional information from the cloud-based repository. The PSDR is further programmed and/or configured to communicate the additional information to at least one of the call handling equipment, the computer aided dispatch system, and the logging system. The PSDR is further programmed and/or configured to input data to the logging system from at least one of the call handling equipment, the computer aided dispatch system, and the cloud-based repository. The system further includes the cloud-based repository programmed and/or configured to communicate with a third party alarm monitoring system and a plurality of PSDRs including the PSDR. The system further includes a call handling system programmed and/or configured to communicate caller information from a communication device of the caller to the PSDR.

In further non-limiting embodiments, the PSDR may send call data and voice data packets to the cloud-based repository for processing with artificial intelligence applications. The PSDR may receive analytic information from the artificial intelligence applications via the cloud-based repository.

In further non-limiting embodiments, the PSDR may be further programmed and/or configured to translate received data from at least one of the additional data repository, the location information database, and the cloud-based repository such that the call handling equipment, the computer aided dispatch system, and the logging system can read the received data.

In further non-limiting embodiments, the cloud-based repository may be further programmed and/or configured to receive alarm data from the third party alarm monitoring system and communicate the alarm data to the PSDR. The PSDR may be further programmed and/or configured to communicate the alarm data to the computer aided dispatch system and establish a two-way communication channel between a dispatcher and the third party alarm monitoring system.

According to a non-limiting embodiment, provided is a computer program product for accessing data about a caller from multiple data sources in real time. The computer program product stores program instructions configured to cause at least one processor of a public safety data router (PSDR) to (a.) communicatively connect with call handling equipment. The program instructions also cause the at least one processor of the PSDR to (b.) in response to a communication being initiated by a caller, receive caller data including a unique caller identifier associated with the caller from the call handling equipment. The program instructions further cause the at least one processor of the PSDR to (c.) communicate, based on the unique caller identifier, a request for initial information to a location information database and/or an additional data repository. The program instructions further cause the at least one processor of the PSDR to (d.) receive the initial information and (e.) reconfigure the initial information from an inbound format to a different outbound format such that the initial information is readable by at least one of the call handling equipment, a computer aided dispatch system, and a public safety information management system. The program instructions further cause the at least one processor of the PSDR to (f.) communicate the initial information to at least one of the call handling equipment, the computer aided dispatch system, and the public safety information management system. The program instructions further cause the at least one processor of the PSDR to (g.) communicate, based on an index or search criteria, a request for additional information to a cloud-based repository. The program instructions further cause the at least one processor of the PSDR to (h.) receive the additional information from the cloud-based repository. The program instructions further cause the at least one processor of the PSDR to (i.) communicate the additional information to at least one of the call handling equipment, the computer aided dispatch system, and the public safety information management system for display to a user.

In further non-limiting embodiments, the program instructions may be further configured to cause the at least one processor of the PSDR to, before step (a.), connect to the cloud-based repository, wherein a connection between the PSDR and the cloud-based repository is executed through a public safety agency network. The program instructions may be further configured to cause the a least one processor of the PSDR to, before step (a.), request, through the public safety agency network, configuration data from a cloud-based management platform of the cloud-based repository. The program instructions may be further configured to cause the a least one processor of the PSDR to, before step (a.), receive the configuration data and configure, based on the configuration data, communication settings of the PSDR to allow the PSDR to freely download data from and upload data to the cloud-based repository.

Further non-limiting embodiments of the disclosure are provided according to the following clauses:

Clause 1: A computer-implemented method of accessing data about a caller from multiple data sources in real time, the method comprising: a.) communicatively connecting, by a public safety data router (PSDR), with call handling equipment; b.) in response to a communication being initiated by the caller, receiving, at the PSDR, caller data comprising a unique caller identifier associated with the caller from the call handling equipment; c.) communicating, by the PSDR based on the unique caller identifier, a request for initial information to a location information database and/or an additional data repository; d.) receiving, by the PSDR, the initial information; e.) reconfiguring, by the PSDR, the initial information from an inbound format to a different outbound format such that the initial information is readable by at least one of the call handling equipment, a computer aided dispatch system, and a public safety information management system; f.) communicating, by the PSDR, the initial information to at least one of the call handling equipment, the computer aided dispatch system, and the public safety information management system; g.) communicating, by the PSDR based on an index or search criteria, a request for additional information to a cloud-based repository; h.) receiving, by the public safety router, the additional information from the cloud-based repository; and i.) communicating, by the PSDR, the additional information to at least one of the call handling equipment, the computer aided dispatch system, and the public safety information management system for display to a user.

Clause 2: The computer-implemented method according to clause 1, further comprising, before step (a.): connecting, by the PSDR, to the cloud-based repository, wherein a connection between the PSDR and the cloud-based repository is executed through a public safety agency network; requesting, by the PSDR through the public safety agency network, configuration data from a cloud-based management platform of the cloud-based repository; receiving, by the PSDR, the configuration data; and configuring, by the PSDR based on the configuration data, communication settings of the PSDR to allow the PSDR to freely download data from and upload data to the cloud-based repository.

Clause 3: The computer-implemented method according to clause 1 or 2, wherein the PSDR directly communicates the initial information and the additional information to the computer aided dispatch system.

Clause 4: The computer-implemented method according to any of clauses 1-3, further comprising: directly communicating, by the PSDR, with a logging system; and inputting, by the PSDR, data into the logging system from at least one of the call handling equipment, the computer aided dispatch system, and the cloud-based repository.

Clause 5: The computer-implemented method according to any of clauses 1-4, wherein the PSDR directly communicates with an automatic location identification provider, the location information database, or the additional data repository to receive at least a portion of the initial information.

Clause 6: The computer-implemented method according to any of clauses 1-5, further comprising: receiving, by the PSDR with a link to an automatic location information (ALI) modem, an automatic number identification, a pseudo-automatic number identification, or other unique identification tag; relating, by the PSDR between step (b.) and step (c.), the automatic number identification, the pseudo-automatic number identification, or the other unique identification tag to the caller data; and communicating, by the PSDR, the automatic number identification, the pseudo-automatic number identification, or the other unique identification tag to the call handling equipment.

Clause 7: The computer-implemented method according to any of clauses 1-6, further comprising receiving, by the PSDR, a request for location data from the call handling equipment, the request for the location data comprising the automatic number identification, the pseudo-automatic number identification, or the other unique identification tag.

Clause 8: The computer-implemented method according to any of clauses 1-7, further comprising translating, by the PSDR, data from at least one of the additional data repository, the location information database, and the cloud-based repository such that the call handling equipment, computer aided dispatch system, and logging system can read the translated data.

Clause 9: The computer-implemented method according to any of clauses 1-8, wherein, in response to the call handling equipment requesting the location data by sending the automatic number identification to the PSDR, the PSDR requests the location data from the ALI modem and the cloud-based repository, and i.) in response to the PSDR not receiving the location data from the cloud-based repository within a predetermined period of time, the PSDR sends the location data received from the ALI modem to the call handling equipment, or ii.) in response to the PSDR receiving the location data from the cloud-based repository before receiving the location data from the ALI modem, the PSDR sends the location data from the cloud-based repository and prepares queued location data from the ALI modem.

Clause 10: The computer-implemented method according to any of clauses 1-9, wherein, in response to the call handling equipment requesting the location data by sending the pseudo-automatic number identification to the PSDR, the PSDR requests the location data from the ALI modem and the cloud-based repository, wherein the PSDR sends the location data received from the ALI modem to the call handling equipment, and wherein the PSDR prepares queued location data from the cloud-based repository.

Clause 11: The computer-implemented method according to any of clauses 1-10, wherein the call handling equipment requests the queued location data from the PSDR after step (ii.), and wherein the PSDR sends the queued location data to the call handling equipment.

Clause 12: The computer-implemented method according to any of clauses 1-11, wherein the call handling equipment requests the queued location data from the PSDR, and wherein the PSDR sends the queued location data to the call handling equipment.

Clause 13: The computer-implemented method according to any of clauses 1-12, further comprising, in response to the cloud-based repository receiving alarm data from a third party alarm monitoring system: receiving, by the PSDR, the alarm data from the cloud-based repository; communicating, by the PSDR, the alarm data to the computer aided dispatch system; and establishing, by the PSDR, a two-way communication channel between a dispatcher and the third party alarm monitoring system.

Clause 14: The computer-implemented method according to any of clauses 1-13, wherein the cloud-based repository is programmed and/or configured to communicate with a plurality of PSDRs comprising the PSDR.

Clause 15: The computer-implemented method of any of clauses 1-14, wherein the caller initiates communication with the call handling equipment as a video call, a voice call, a text message, an email, or other electronic communication.

Clause 16: A system for accessing data about a caller from multiple data sources in real time, the system comprising: a computer aided dispatch system; a logging system; a public safety data router (PSDR) programmed and/or configured to: request initial information from an automatic location information (ALI) modem, causing the ALI modem to access the initial information from a location information database; receive the initial information from the ALI modem, wherein the PSDR receives and reconfigures the initial information from an inbound format to a different outbound format such that the data is readable to call handling equipment; in response to the ALI modem receiving the initial information from the location information database and/or the additional data repository, communicate the initial information to the call handling equipment; request additional information from a cloud-based repository; receive the additional information from the cloud-based repository; communicate the additional information to at least one of the call handling equipment, the computer aided dispatch system, and the logging system; and input data to the logging system from at least one of the call handling equipment, the computer aided dispatch system, and the cloud-based repository; the cloud-based repository programmed and/or configured to communicate with a third party alarm monitoring system and a plurality of PSDRs comprising the PSDR; and a call handling system programmed and/or configured to communicate caller information from a communication device of the caller to the PSDR.

Clause 17: The system according to clause 16, wherein the PSDR is further programmed and/or configured to translate received data from at least one of an additional data repository, the location information database, and the cloud-based repository such that the call handling equipment, the computer aided dispatch system, and the logging system can read the received data.

Clause 18: The system according to clause 16 or 17, wherein the cloud-based repository is further programmed and/or configured to receive alarm data from the third party alarm monitoring system and communicate the alarm data to the PSDR, wherein the PSDR is further programmed and/or configured to communicate the alarm data to the computer aided dispatch system and establish a two-way communication channel between a dispatcher and the third party alarm monitoring system.

Clause 19: A computer program product for accessing data about a caller from multiple data sources in real time, the computer program product storing program instructions configured to cause at least one processor of a public safety data router (PSDR) to: a.) communicatively connect with call handling equipment; b.) in response to a communication being initiated by the caller, receive caller data comprising a unique caller identifier associated with the caller from the call handling equipment; c.) communicate, based on the unique caller identifier, a request for initial information to a location information database and/or an additional data repository; d.) receive the initial information; e.) reconfigure the initial information from an inbound format to a different outbound format such that the initial information is readable by at least one of the call handling equipment, a computer aided dispatch system, and a public safety information management system; f.) communicate the initial information to at least one of the call handling equipment, the computer aided dispatch system, and the public safety information management system; g.) communicate, based on an index or search criteria, a request for additional information to a cloud-based repository; h.) receive the additional information from the cloud-based repository; and i.) communicate the additional information to at least one of the call handling equipment, the computer aided dispatch system, and the public safety information management system for display to a user.

Clause 20: The computer program product of clause 19, wherein the program instructions are further configured to cause the at least one processor of the PSDR to, before step (a.): connect to the cloud-based repository, wherein a connection between the PSDR and the cloud-based repository is executed through a public safety agency network; request, through the public safety agency network, configuration data from a cloud-based management platform of the cloud-based repository; receive the configuration data; and configure, based on the configuration data, communication settings of the PSDR to allow the PSDR to freely download data from and upload data to the cloud-based repository.

BRIEF DESCRIPTION OF THE DRAWINGS

The advantages of the embodiments of this disclosure described above, together with further advantages, may be better understood by referring to the following description taken in conjunction with the accompanying drawings. The drawings are not necessarily to scale, emphasis instead generally being placed upon illustrating the principles of the invention. It is to be expressly understood that the drawings are for the purpose of illustration and description only and are not intended as a definition of the limits of the invention. As used in the specification and the claims, the singular forms of "a", "an", and "the" include plural referents unless the context clearly dictates otherwise.

DETAILED DESCRIPTION OF THE INVENTION

Figure 1:
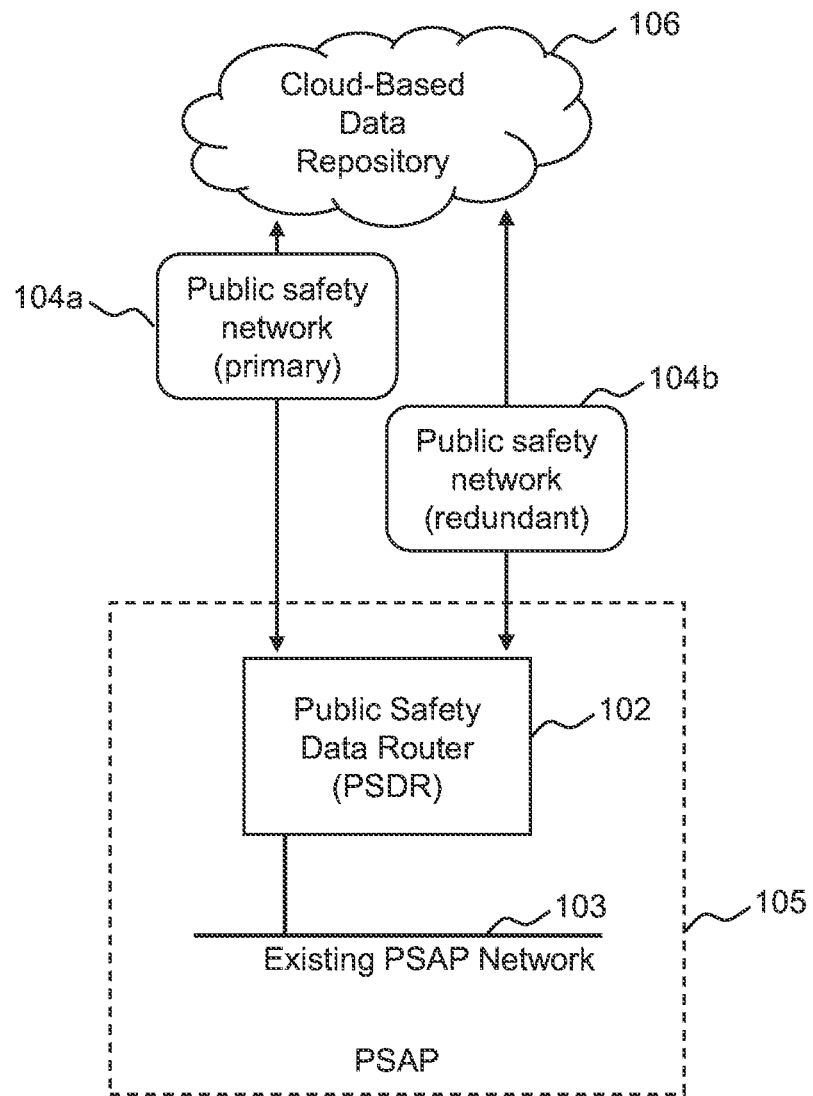
FIG. 1 is a block diagram of a method used to establish a secure, persistent endpoint at a public safety answering point (PSAP) 105 utilizing a public safety network as an interconnection medium.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

A caller, as used herein, may be an individual initiating communication with a public safety system, such as 9-1-1, via telephone or mobile phone call, video call, text message, email, or any other mode of communication compatible with the caller's local PSAP. Thus, likewise, a call or a communication may mean a communication initiated by telephone, mobile phone, video call, text message, email, or any other mode of communication compatible with the local safety system.

Non-limiting embodiments of the disclosure provide the advantage of connecting emergency response systems, e.g., legacy systems, as described in more detail herein below, to new data sources such as additional data repositories, and requesting, receiving, processing, and reconfiguring the data such that it is able to be processed by the legacy systems. The device also provides the ability to collect data from multiple sources, including legacy sources. The collected information is then processed and reconfigured, in real-time with call intake and/or cloud-based communicative connection, so that it is readable by the legacy systems. This results in efficient interfacing of the legacy systems with the new data sources and FirstNet without expensive and time-consuming retrofitting or complete replacement of legacy system hardware and/or software. The device disclosed herein also makes the processing of response to calls, whether by phone, mobile, text message, email, or any communication, more efficient. The legacy data sources and new data sources can be accessed simultaneously, with the results of the data requests being communicated to the legacy 9-1-1 or emergency response systems more accurately and efficiently. This results in an overall increase in speed from the time a call is initiated to the time the legacy system is able to display the relevant information to a system operator, which in turn, results in faster emergency response times.

Accessing Caller Data from Multiple Data Sources in Real-Time

FIG. 1 is a block diagram of a method used to establish a secure, persistent endpoint at a public safety answering point (PSAP) 105 utilizing a public safety network 103 as an interconnection medium. The system includes a public safety data router (PSDR) 102 of a PSAP 105, the cloud-based data repository 106, and one or more connections to a public safety network 104, e.g., a primary public safety network connection 104a, a redundant public safety network connection 104b, and one or more additional network connections.

Figure 2:
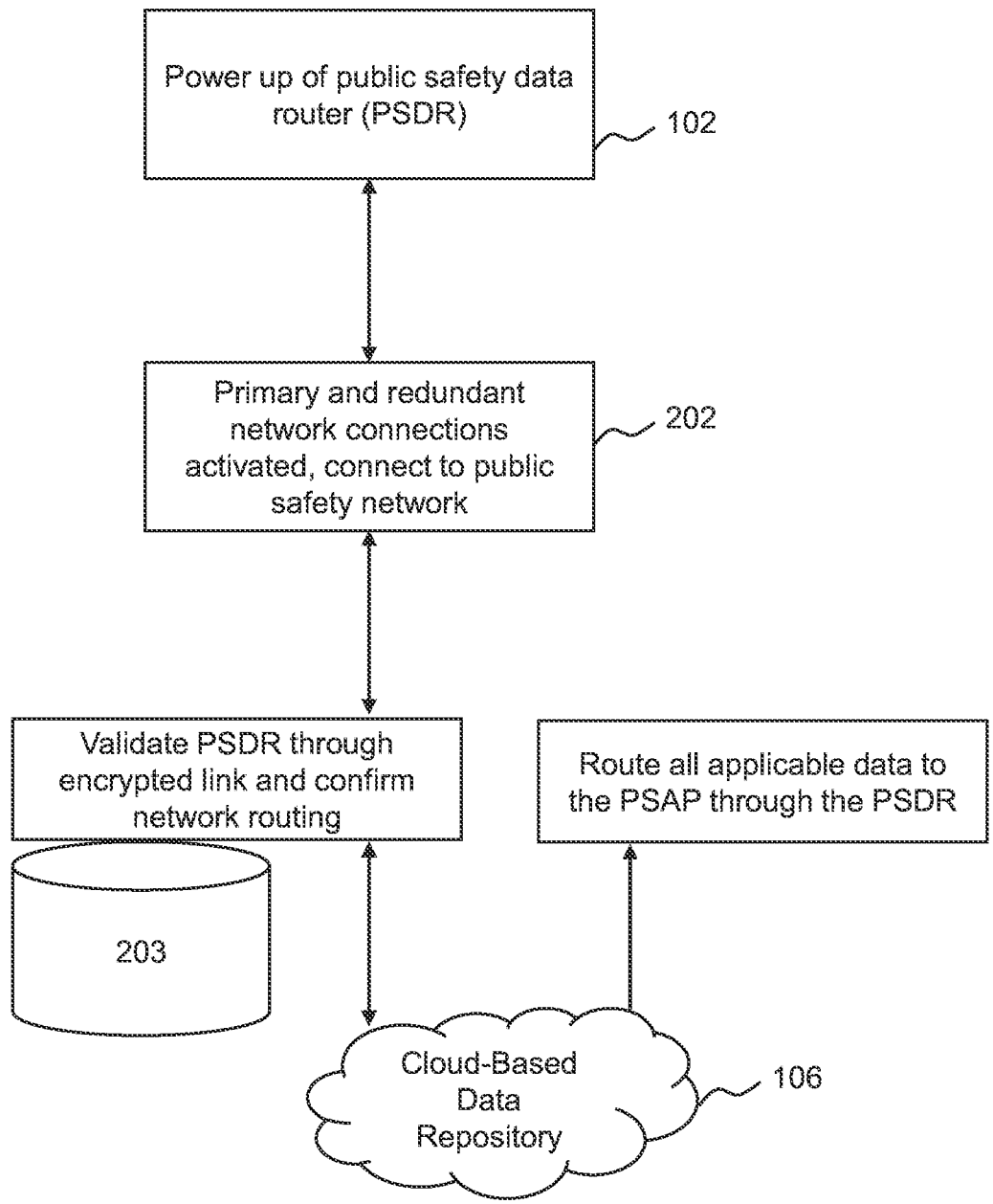
FIG. 2 is a flow diagram of a method to establish a secure, persistent endpoint at a PSAP utilizing a public safety network as an interconnection medium to a cloud-based repository 106 (e.g., cloud-based national directory)

FIG. 2 is a flow diagram of a method to establish a secure, persistent endpoint at a PSAP utilizing a public safety network as an interconnection medium to a cloud-based repository 106, e.g., a cloud-based national directory. The PSDR 102 establishes a connection with the public safety network upon power-up. Once a reliable connection has been established with the public safety network 202 (e.g., FirstNet), the PSDR 102 establishes an encrypted communication channel with the cloud-based data repository 106. Upon establishing the encrypted channel, the PSDR 102 authenticates itself to the network 203 and requests configuration details. The cloud-based data repository 106 conducts reliability and functional tests of the communication channel and the PSDR 102, then forwards configuration information to the PSDR 102.

The PSDR 102 receives the configuration information and configures or re-configures itself according to the parameters supplied by the cloud-based data repository 106 (e.g., cloud-based data store). Once configuration is complete, the cloud-based data repository 106 marks the remote PSAP as operational and forwards any queued messages or forwards new messages as they arrive.

Figure 3:
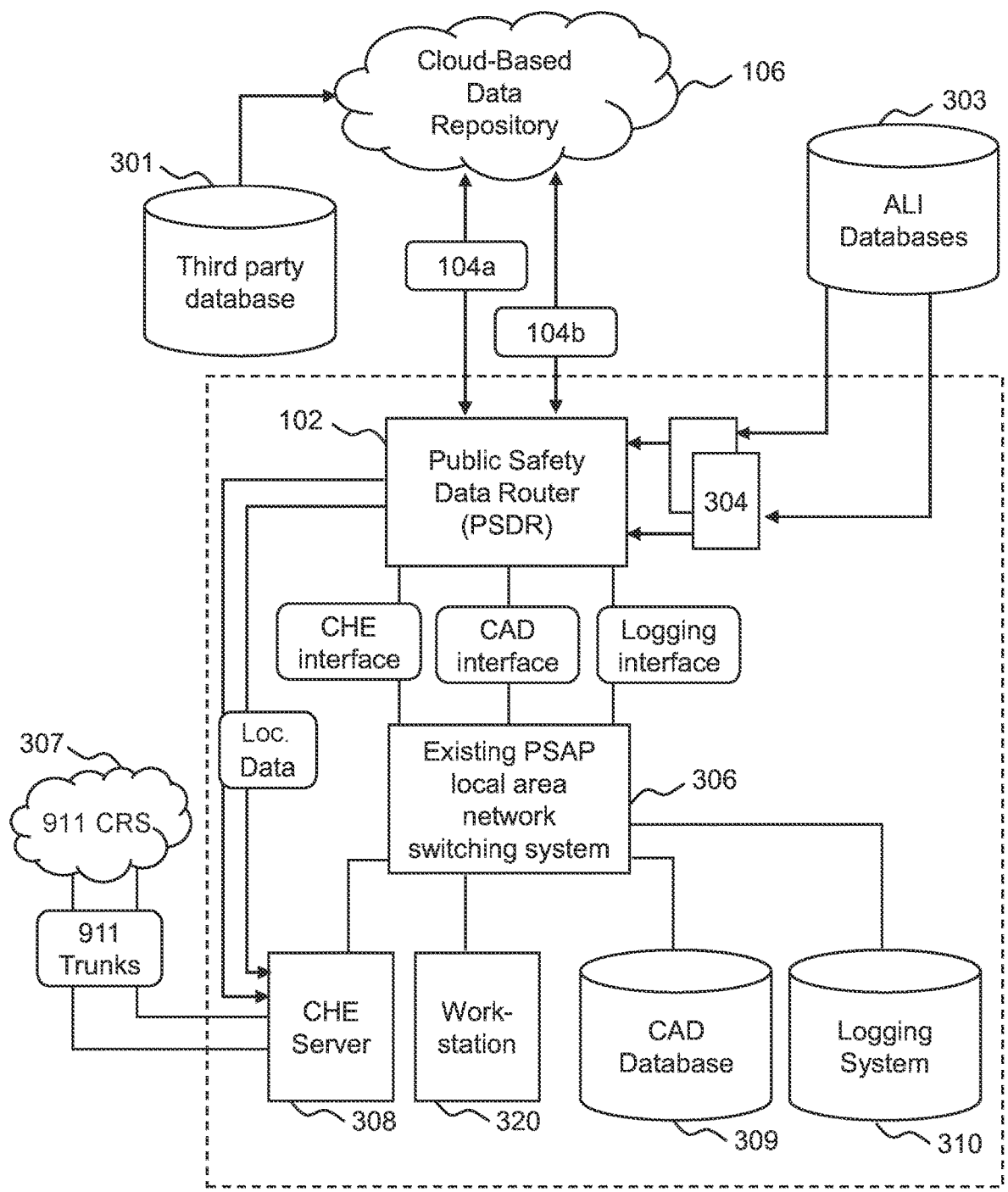
FIG. 3 is a block diagram of the PSAP with a public safety data router (PSDR) 102, according to this disclosure, and connections via an existing PSAP local area network switching system 306 to call handling equipment, computer aided dispatch systems, call recording systems, and others.

FIG. 3 is a block diagram of the PSAP with the PSDR 102 and connections to call handling equipment (e.g., call handling server) 308, computer aided dispatch (CAD) systems (e.g., including one or more CAD databases) 309, call recording systems (e.g., logging recorder) 310, and others. The PSDR 102 provides serial communication input and output connections 304 (e.g., ALI modems, RS-232) as well as Ethernet connectivity to a call handling system 306 (e.g., through an existing PSAP local area network switching system). The call handling system 306 may also be communicatively connected to a personnel workstation 320 (e.g., computing device with a display and one or more input interfaces) for a user to view data from the PSDR 102.

For the automatic location identification (ALI) interface, the ALI modems 304 at the PSAP connect directly to the call handling equipment 308 to provide serial location data, e.g., from ALI databases 303, when a 9-1-1 call is received. The existing serial communication links between the ALI modems 304 and the call handling equipment 308 are rerouted to terminate in the PSDR 102 and the outputs from the PSDR 102 are terminated by the call handling equipment 308. The connections may be color-coded to provide quick installation.

FIG. 3 shows an interface with a computer aided dispatch (CAD) system 309. The PSDR 102 is configured to provide a software service that would interact with the local CAD system 309 via different standards-based protocols. One of the individual Ethernet ports on the PSDR 102 is configured to match the network settings in use at the local site.

FIG. 3 shows a similar interface with a voice recording/voice logging system 310 at the PSAP. Another Ethernet interface (e.g., at 102, 306) is configured to match the local network settings for the recording network 310 and the PSDR 102 provides a software service to receive input data from both CAD 309, the CHE 308, and the cloud-based data repository 106 to provide additional data to the local logging recorder 310. The CHE server 308 includes one or more trunks (e.g., communicative connections) to 9-1-1 call routing system (CRS) 307.

Figure 4:
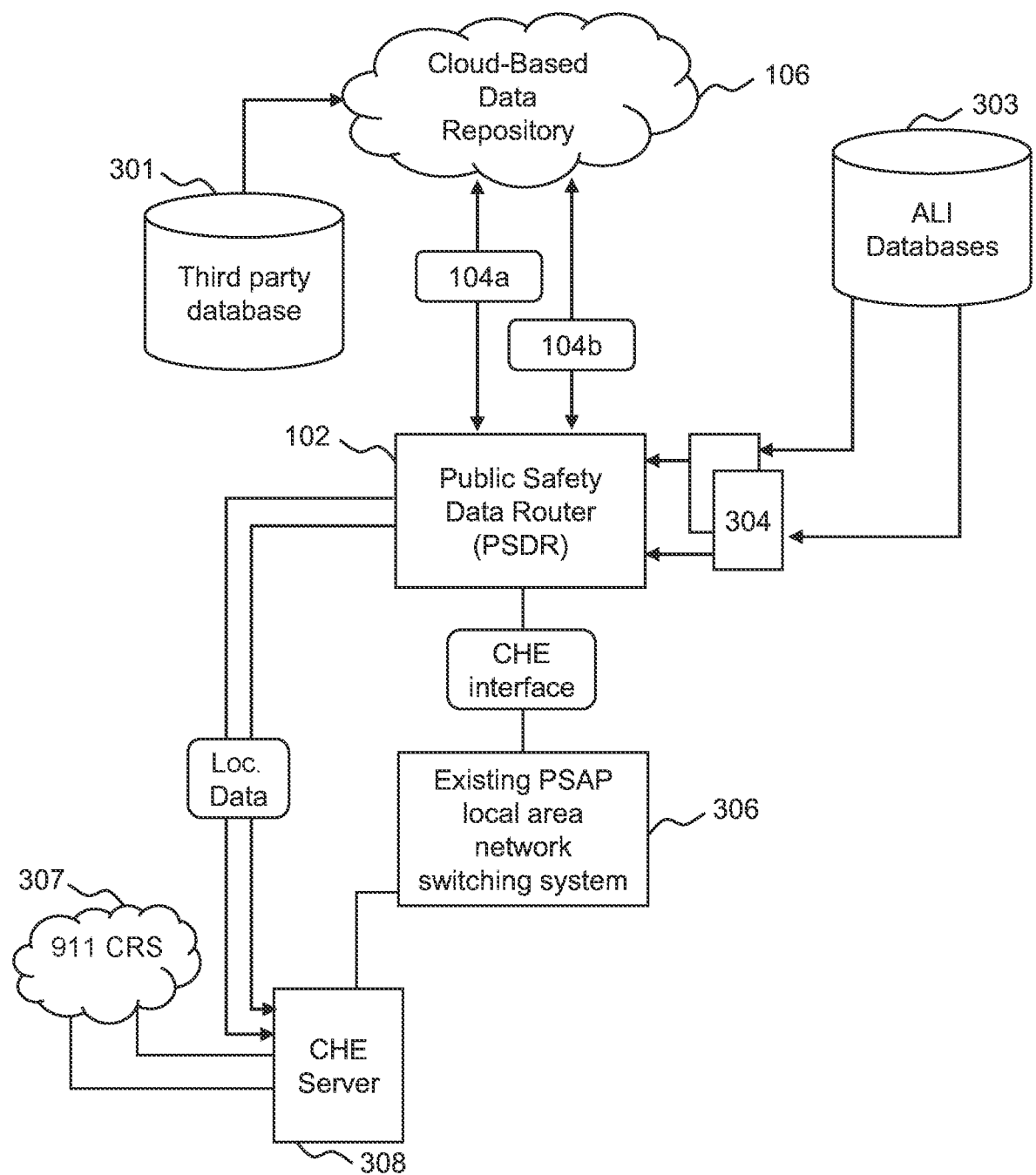
FIG. 4 is a block diagram of a method for integrating additional location data into an existing call handling system 308.

FIG. 4 is a block diagram of a method for integrating additional location data (e.g., from a third party additional location information database 301 or ALI databases 303) into an existing call handling system 306. The system includes the PSDR 102, the cloud-based data repository (e.g., cloud-based data store) 106, the call handling equipment 308, and a third party additional data repository (ADR) 301.

Figure 5:
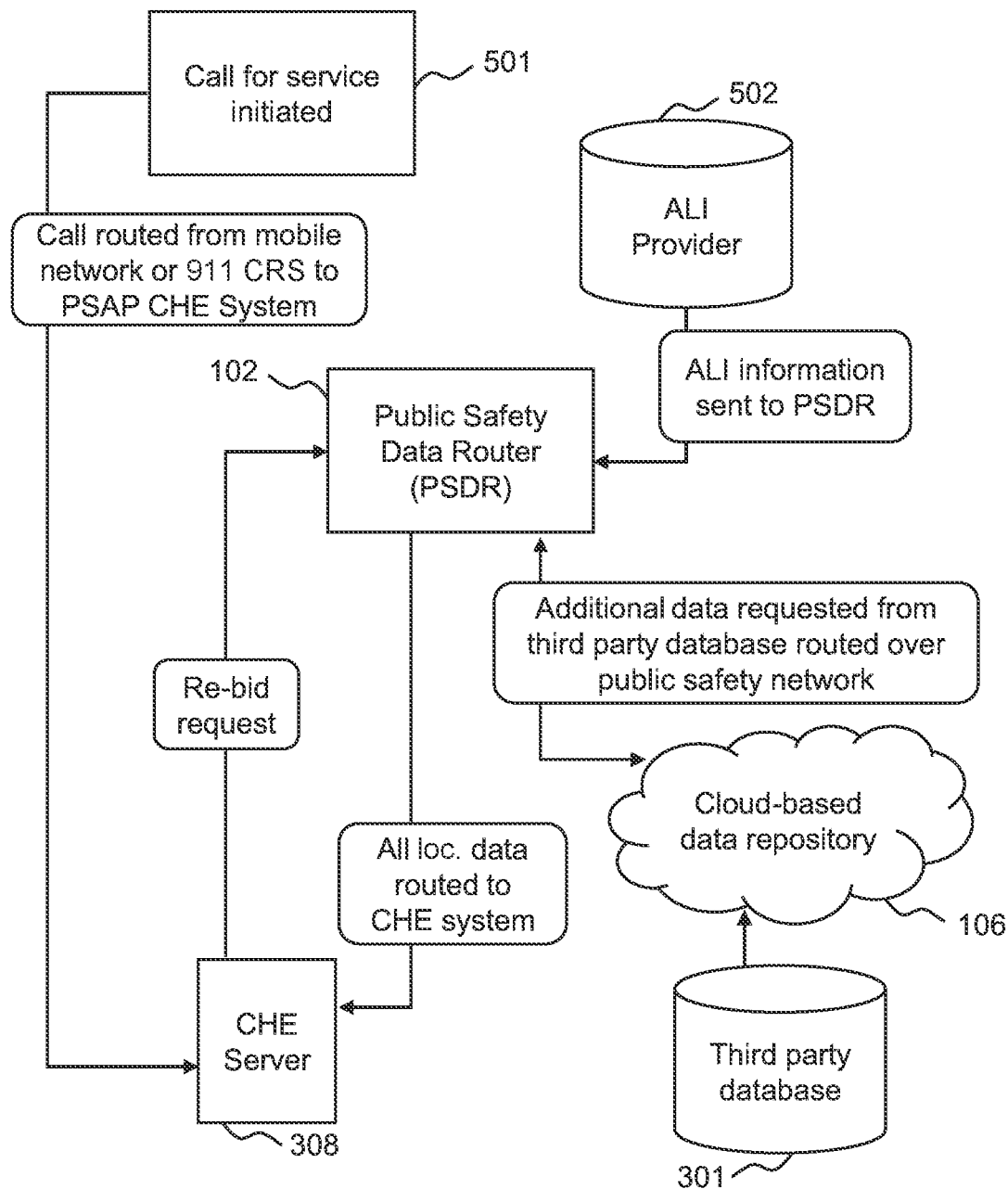
FIG. 5 is a flow diagram of a method for integrating additional location data into an existing call handling system 308.

FIG. 5 is a flow diagram of a method for integrating additional location data (e.g., from a third party additional data repository 301) into an existing call handling system. Based on a configuration similar to that of FIG. 3, a 9-1-1 call 501 would be received by the call handling equipment 308. The caller's automatic number identification (ANI) or pseudo-ANI (pANI) would be provided to the call handling equipment 308 by the 9-1-1 call routing system (CRS).

The PSDR 102 is in-line with the serial communication to and from the PSAP's automatic location identification (ALI) provider 502. All requests from the PSAP and responses to the PSAP are monitored by the PSDR 102.

If a request was made from the call handling equipment 308 to the ALI provider 502 with ANI, the PSDR 102 would immediately initiate a request to the cloud-based data repository 106 for additional data. The cloud-based data repository 106 would retrieve the additional location data, if available, and transmit it to the PSDR 102. The PSDR 102 would format the additional location information in a manner that was consistent with the equipment in use at the PSAP.

If a response from the ALI provider 502 for the ANI arrived at the PSAP prior to the response from the cloud-based data repository 106, the PSDR 102 would delay the response (e.g., queue the relay of data) to the call handling equipment 308 for a predetermined, configurable period of time. If no response was received from the cloud-based data repository 106 when the timeout timer expired, the PSDR 102 would deliver the response from the ALI provider 502 as it was received.

If a response from the cloud-based data repository 106 for the ANI arrived at the PSAP before the response from the ALI provider 502, or within the configurable timeout window, the PSDR 102 would transmit the additional location information to the call handling equipment 308 and queue the response from the ALI provider 502.

If the 9-1-1 telecommunicator initiated a "re-bid" request to re-poll the ALI provider 502 for an updated location, the PSDR 102 would immediately provide the queued ALI responses and pass through the "re-bid" request to the ALI provider 502.

If a request was made from the call handling equipment 308 to the ALI provider 502 with pANI, the PSDR 102 would monitor the response from the ALI service provider 502. Once a response was received, the PSDR 102 would extract the caller's telephone number from the record and transmit the response from the ALI service provider 502 to the call handling equipment 308.

The PSDR 102 would immediately initiate a request to the cloud-based data repository 106 for additional data (e.g., from a third party additional data repository 301). The cloud-based data repository 106 would retrieve the additional location data, if available, and transmit it to the PSDR 102. The PSDR 102 would format the additional location information in a manner that was consistent with the equipment in use at the PSAP.

If the 9-1-1 telecommunicator initiated a "re-bid" request to re-poll the ALI provider 502 for an updated location, the PSDR 102 would immediately provide the queued additional data responses and pass through the "re-bid" request to the ALI provider 502.

Figure 6:
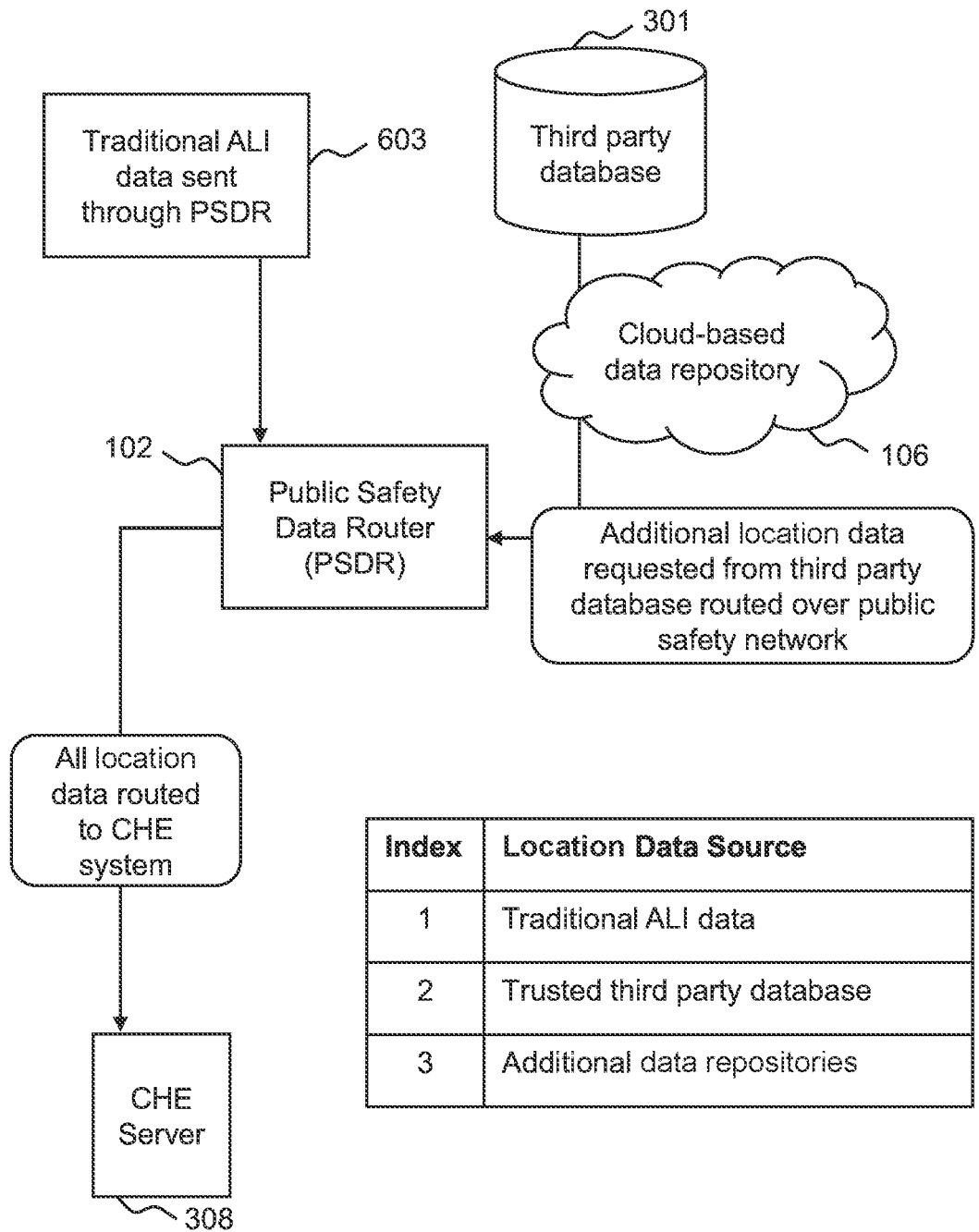
FIG. 6 is a block diagram of a method for integrating a third-party source of additional data to the public safety answering point 308 via a cloud-based data repository 106 serving as a directory of participating sites.

FIG. 6 is a block diagram of a method for integrating a third party source of additional data (e.g., from a third party additional data repository 301) to the public safety answering point via a cloud-based data repository 106 serving as a directory of participating sites.

With further reference to the foregoing figures, and in further non-limiting embodiments or aspects, the system includes the PSDR 102, the PSAP CAD system, the third party source of additional data 301, an alarm monitoring service, the public safety network, and the cloud-based data repository 106.

Upon successful power-up, testing, and configuration, the PSDR 102 establishes itself as an operational public safety data endpoint on the cloud-based data repository network. The cloud-based data repository configures the endpoint as a fully-qualified domain name in the cloud-based data repository national directory.

The third party alarm monitoring service implements a PSDR and also establishes itself as a participant in the cloud-based data repository network and is similarly assigned a fully qualified domain name (FQDN).

The third party alarm monitoring service processes an alarm for a customer. The alarm monitoring service has configured the endpoint FQDN of the PSAP having jurisdiction for the customer's address. The alarm monitoring service transmits the alarm to the cloud-based data repository with the desired endpoint name.

The cloud-based data repository determines the most efficient, effective, and fastest path to deliver the information to the PSDR. The cloud-based data repository transmits the information to the PSDR. The PSDR receives the information and establishes a connection with a local software service running on the PSAP's CAD system to process the alarm information.

Using standard protocols, the PSDR transmits the information to the PSAP CAD system. The PSAP CAD system acknowledges the message and transmits an acknowledgement. The PSDR receives the acknowledgement and transmits it to the cloud-based data repository. The cloud-based data repository determines the most efficient, effective, and fastest path to deliver the information to the alarm monitoring service. The cloud-based data repository transmits the acknowledgement to the alarm monitoring service.

Figure 7:
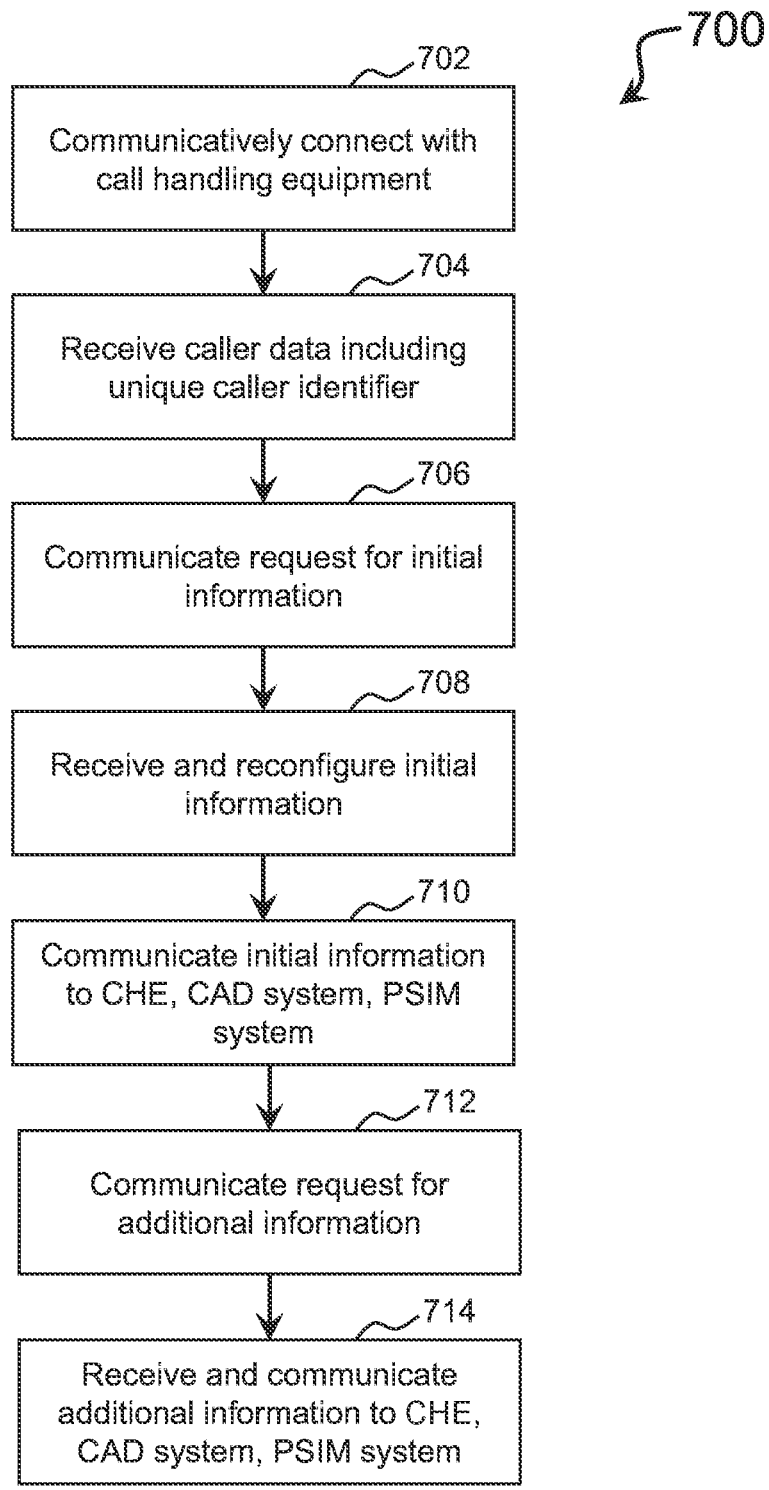
FIG. 7 is a process diagram according to non-limiting embodiments of a method for accessing data about a caller from multiple data sources in real time.

With reference to FIG. 7, in non-limiting embodiments, depicted is a method 700 for accessing data about a caller from multiple sources in real-time. One or more steps of the method 700 may be completed by a public safety data router (PSDR) or other computing device. In step 702, the PSDR may communicatively connect with call handling equipment. In step 704, the PSDR may, in response to a communication being initiated by a caller, receive caller data including a unique caller identifier (e.g., text string, numerical string, alphanumeric code, hardware address, etc.) from the call handling equipment. In step 706, the PSDR may communicate, based on the unique caller identifier, a request for initial information to a location information database, an additional data repository, or a combination thereof. In step 708, the PSDR may receive the requested initial information and reconfigure the initial information from an inbound format to a different outbound format such that the initial information is readable by the call handling equipment, a computer aided dispatch system, a public safety information management system, or a combination thereof. The PSDR may directly communicate with an automatic location identification provider or the location information database to receive at least a portion of the initial information. In step 710, the PSDR may communicate the initial information to the call handling equipment, computer aided dispatch system, public safety information management system, or a combination thereof.

In step 712, the PSDR may communicate, based on an index or search criteria, a request for additional information to a cloud-based repository. In step 714, the PSDR may receive the additional information from the cloud-based repository and communicate the additional information to the call handling equipment, computer aided dispatch system, and/or public safety information management system for display to a user. The PSDR may directly communicate the initial information and/or the additional information to the computer aided dispatch system.

With further reference to FIG. 7, and in further non-limiting embodiments, the PSDR may, before step 702, connect to the cloud-based repository, wherein a connection between the PSDR and the cloud-based repository is executed through a public safety agency network. Further, the PSDR may request, through the public safety agency network, configuration data from a cloud-based management platform of the cloud-based repository. The PSDR may receive the configuration data from the cloud-based repository and configure communication settings of the PSDR (e.g., data format, communication channel, etc.) to allow the PSDR to freely download data from and upload data to the cloud-based repository. At one or more points in method 700 (e.g., when data is received, such as after step 702, after step 708, after step 714, etc.), the PSDR may directly communicate with a logging system and input data (e.g., initial information, additional information, caller data, etc.) into the logging system from at least one of the following: call handling equipment, computer aided dispatch system, cloud-based repository, or any combination thereof.

With further reference to FIG. 7, and in further non-limiting embodiments, between step 704 and step 706, the PSDR may receive, via a link (e.g., physical, digital, or a combination thereof) to an automatic location information (ALI) modem, an automatic number identification (ANI) (e.g., caller's telephone line number), a pseudo-automatic number identification (pANI) (e.g., a routing number), or other unique identification tag. Further between steps 704 and 706, the PSDR may relate the ANI, pANI, or other unique identification tag to the caller data. Further between steps 704 and 706, the PSDR may communicate the ANI, pANI, or other unique identification tag to the call handling equipment (CHE). Subsequent to the foregoing steps, the PSDR may receive a request for location data from the CHE, the request including the ANI, pANI, or other unique identification tag. The PSDR may translate data from at least one of the additional data repository, the location information database, and the cloud-based repository such that the CHE, computer aided dispatch system, and logging system can read the translated data.

In response to the CHE requesting the location data by sending the ANI to the PSDR, the PSDR may request the location data from the ALI modem and the cloud based repository. In response to the PSDR not receiving the location data from the cloud-based repository within a predetermined period of time (e.g., a programmed number of seconds), the PSDR may send the location data received from the ALI modem to the CHE. In response to the PSDR receiving the location data from the cloud-based repository before receiving the location data from the ALI modem, the PSDR may send the location data from the cloud-based repository and prepare queued location data (e.g., wait for location data and/or delay the sending of received location data) from the ALI modem. The CHE may request the queued location data from the PSDR, and the PSDR may send the queued location data to the CHE in response.

In response to the CHE requesting the location data by sending the pANI to the PSDR, the PSDR may request the location data from the ALI modem and the cloud-based repository. The PSDR may send the location data received from the ALI modem to the CHE and prepare queued location data (e.g., wait for location data and/or delay the sending of received location data) from the cloud-based repository. The CHE may request the queued location data from the PSDR, and the PSDR may send the queued location data to the CHE in response.

With further reference to the foregoing figures, and with specific reference to FIG. 7, at one or more points in method 700, the cloud-based repository may receive alarm data (e.g., type of alarm, location associated with alarm, user identifier associated with alarm, etc.) from a third party alarm monitoring system. The PSDR may receive the alarm data from the cloud-based repository and communicate the alarm data to the computer aided dispatch system. The PSDR may also establish a two-way communication channel between a dispatcher and the third party alarm monitoring system (e.g., a personnel thereof, a computer thereof, etc.).

The cloud-based repository may be programmed and/or configured to communicate with a plurality of PSDRs.

Figure 8:
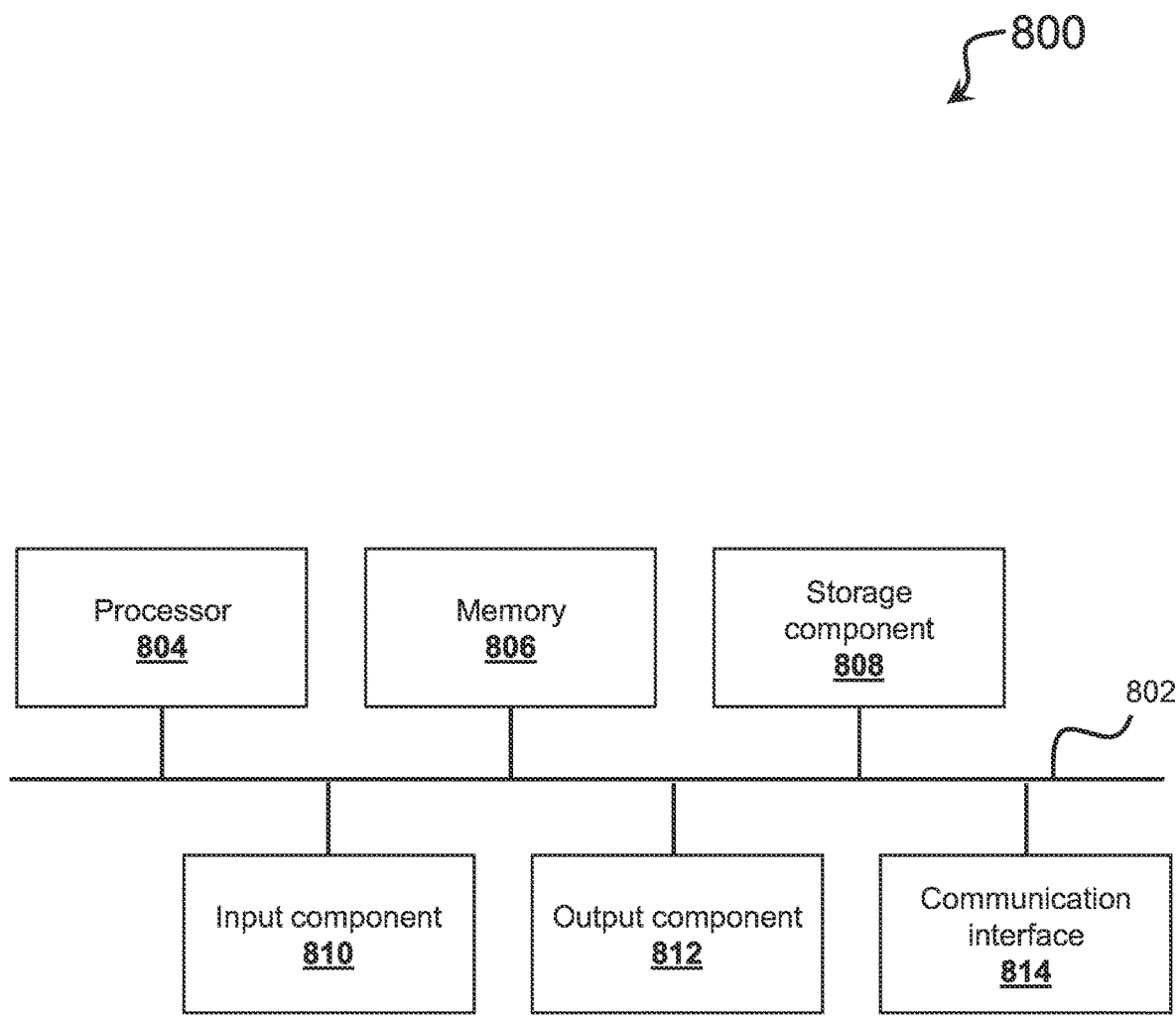
FIG. 8 is a schematic diagram of a computing device to be used in non-limiting embodiments of systems and methods for accessing data about a caller from multiple data sources in real time.

Referring now to FIG. 8, illustrated is a diagram of example components of device 800. Device 800 may correspond to one or more devices of a public safety data router (PSDR) 102, call handling equipment 308, workstation 320, computer-aided dispatch system 309, logging system 310, 9-1-1 CRS 307, ALI provider 303, third party additional data repository 301 systems, public safety information management system, and/or cloud-based data repository 106. In some non-limiting embodiments or aspects, one or more devices of the foregoing may include at least one device 800 and/or at least one component of device 800. As shown in FIG. 8, device 800 may include bus 802, processor 804, memory 806, storage component 808, input component 810, output component 812, and communication interface 814.

Bus 802 may include a component that permits communication among the components of device 800. In some non-limiting embodiments or aspects, processor 804 may be implemented in hardware, software, or a combination of hardware and software. For example, processor 804 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 806 may include random access memory (RAM), read-only memory (ROM), and/or another type of dynamic or static storage device (e.g., flash memory, magnetic memory, optical memory, etc.) that stores information and/or instructions for use by processor 804.

Storage component 808 may store information and/or software related to the operation and use of device 800. For example, storage component 808 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 810 may include a component that permits device 800 to receive information, such as via user input (e.g., a touchscreen display, a keyboard, a keypad, a mouse, a button, a switch, a microphone, a camera, etc.). Additionally or alternatively, input component 810 may include a sensor for sensing information (e.g., a global positioning system (GPS) component, an accelerometer, a gyroscope, an actuator, etc.). Output component 812 may include a component that provides output information from device 800 (e.g., a display, a speaker, one or more light-emitting diodes (LEDs), etc.).

Communication interface 814 may include a transceiver-like component (e.g., a transceiver, a separate receiver and transmitter, etc.) that enables device 800 to communicate with other devices, such as via a wired connection, a wireless connection, or a combination of wired and wireless connections. Communication interface 814 may permit device 800 to receive information from another device and/or provide information to another device. For example, communication interface 814 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 800 may perform one or more processes described herein. Device 800 may perform these processes based on processor 804 executing software instructions stored by a computer-readable medium, such as memory 806 and/or storage component 808. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 806 and/or storage component 808 from another computer-readable medium or from another device via communication interface 814. When executed, software instructions stored in memory 806 and/or storage component 808 may cause processor 804 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 806 and/or storage component 808 may include data storage or one or more data structures (e.g., a database, and/or the like). Device 800 may be capable of receiving information from, storing information in, communicating information to, or searching information stored in the data storage or one or more data structures in memory 806 and/or storage component 808. For example, the information may include encryption data, input data, output data, transaction data, account data, or any combination thereof.

The number and arrangement of components shown in FIG. 8 are provided as an example. In some non-limiting embodiments or aspects, device 800 may include additional components, fewer components, different components, or differently arranged components than those shown in FIG. 8. Additionally or alternatively, a set of components (e.g., one or more components) of device 800 may perform one or more functions described as being performed by another set of components of device 800.

Machine-Learning Techniques to Enhance Emergency Identification

In addition to the systems, methods, and computer program products described above, machine-learning techniques and models may be employed to enhance the data being relayed to computer aided dispatch systems and emergency responder personnel. The public safety data router (PSDR) may perform voice and data analytics on the voice call and information made available from the cloud-based repository for purposes of gaining additional situational awareness about the request for service. The PSDR may stream voice data packets to the cloud based repository for utilizing artificial intelligence applications for analyzing the call.

The artificial intelligence applications may perform a variety of functions to improve the call taker or dispatcher's understanding of the emergency. The artificial intelligence applications may filter through available data to provide insights back to the call handling equipment or computer aided dispatch application. Machine learning techniques (e.g., recurrent neural networks) may improve the accuracy of standard application logic. For example, machine learning techniques may utilize natural language processing (NLP) to detect noises (e.g., from foreground or background of call audio data input) and suggest contextual insights to categorize the nature of audio data packets. Categories may include, but are not limited to: language/dialect; gunshots; explosions; background ambient noise; number of distinct voices; key word extraction (e.g., descriptions of victims, suspects, vehicles, weapons, etc.); and voice pattern matching or background noise matching (e.g., to detect abusive callers known for berating call takers or "frequent flyers" who continually call for non-emergencies which tie up phone lines and human resources and then send these abusive callers to an automated attendant or alternate destination to deflect the call from emergency call queue). Detected categories of sound and insights from sound analysis may be presented to a call taker/dispatcher.

In another non-limiting example, machine learning techniques may utilize NLP to detect stress or emotional fatigue that meet and/or exceed threshold levels (e.g., representative of significant concern). The call taker/dispatcher may be notified directly, and/or supervisor/management may be alerted that a staff member fielding the caller may need to take break or may need additional attention.

In another non-limiting example, machine learning techniques may utilize key word extraction with automated analysis against resources, such as procedural protocols, to provide instructions to call taker/dispatcher or social media searches to find pertinent insights to the incident, including eyewitness accounts, images, and video that may then be presented to call taker/dispatchers for informing the dispatch.

In another non-limiting example, machine learning techniques may analyze location information in combination with incident information (e.g., report of fire, information that suspect fled in a direction along a route) and use this information to suggest video feeds or sensor statuses to gain situational awareness or confirmation of accounts. To illustrate, given a fire report at a location, the system may reference sensor statuses of six smart-home fire alarms in a townhome complex to confirm a large fire. Given a report of a suspect fleeing, the system may suggest a video feed of a particular road in the direction the suspect was reported to be heading, including the dispatch of a drone to capture live video data in that area.

In another non-limiting example, machine learning techniques may, based on the location and call type, present evacuation plan information and premise key identifier information (e.g., hazardous materials stored on site and their locations to provide warnings and instructions for first responders).

Machine learning models may be trained on and/or accept the following data as inputs: location data (e.g., address, latitude and longitude, floor number, building name, etc.); call type (e.g., intruder, fire, domestic violence, shots fired, active shooter, personal alarm, home alarm, fire alarm, carbon monoxide alarm, flood sensor alert, etc.); audio data packets (e.g., voice data packets); caller identifier (e.g., telephone number, business name, customer name, caller name, etc.); medical/health information; and/or the like. Audio data packets, e.g., voice data packets, may be analyzed according to the following aspects: voice volume; voice tone; voice pitch; voice speed; word analysis; background noise; emotion detection; and/or the like. Machine learning models may be trained to produce the following data as outputs: procedure/protocol recommendations; alert messaging to call taker/dispatcher or management; key word presentation; supplemental information; and/or the like. Outputs may include one or more data packets to a call taker/dispatcher's computing device (e.g., including a display with a user interface to provide alerts, additional data, protocol/procedure information, etc.).

In some non-limiting embodiments, because 9-1-1 calls may be session initiated protocol (SIP)-based, as soon as a call is established (e.g., instantaneously or substantially instantaneously), the audio data of a call can be made available for analytics (e.g., using ML/NLP) even before the call taker/dispatcher has been able to "answer" the call. This would allow for pre-processing of 9-1-1 calls while in queue, perhaps changing priority based on the analyzed data. This allows audio capture and recording before time of answer.

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention. Although the invention has been described in detail for the purpose of illustration based on what are currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that to the extent possible, one or more features of any embodiment or aspect can be combined with one or more features of any other embodiment or aspect.

The invention claimed is:

1. A computer-implemented method of accessing data about a caller from multiple data sources in real time, the method comprising:
    connecting, by a public safety data router (PSDR), to a cloud-based repository, wherein a connection between the PSDR and the cloud-based repository is executed through a network;
    requesting, by the PSDR through the network, configuration data from a device associated with the cloud-based repository;
    receiving, by the PSDR, the configuration data from the device associated with the cloud-based repository;
    configuring, by the PSDR based on the configuration data, communication settings of the PSDR to allow the PSDR to communicate with the cloud-based repository;
    after configuration of the communication settings of the PSDR and in response to a communication being initiated by the caller:
        receiving, at the PSDR, caller data comprising a unique caller identifier associated with the caller from call handling equipment;
        communicating, by the PSDR based on the unique caller identifier, a request for initial information to a location information database and/or an additional data repository;
        receiving, by the PSDR, the initial information;
        reconfiguring, by the PSDR, the initial information from an inbound format to a different outbound format such that the initial information is readable by at least one of the call handling equipment, a computer aided dispatch system, and a public safety information management system; and
        communicating, by the PSDR, the initial information to at least one of the call handling equipment, the computer aided dispatch system, and the public safety information management system;
        communicating, by the PSDR based on an index or search criteria, a request for additional information to the cloud-based repository;
        receiving, by the PSDR, the additional information from the cloud-based repository; and
        communicating, by the PSDR, the additional information to at least one of the call handling equipment, the computer aided dispatch system, and the public safety information management system for display to a user.

2. The computer-implemented method according to claim 1, further comprising, before the communication being initiated by the caller:
    connecting, by the PSDR, to the cloud-based repository, wherein the connection between the PSDR and the cloud-based repository is executed through a public safety agency network;
    requesting, by the PSDR through the public safety agency network, the configuration data from a cloud-based management platform of the cloud-based repository;
    receiving, by the PSDR, the configuration data; and
    configuring, by the PSDR based on the configuration data, the communication settings of the PSDR to allow the PSDR to freely download data from and upload data to the cloud-based repository.

3. The computer-implemented method according to claim 1, wherein the PSDR directly communicates the initial information and the additional information to the computer aided dispatch system.

4. The computer-implemented method according to claim 1, further comprising:
    directly communicating, by the PSDR, with a logging system; and
    inputting, by the PSDR, data into the logging system from at least one of the call handling equipment, the computer aided dispatch system, and the cloud-based repository.

5. The computer-implemented method according to claim 1, wherein the PSDR directly communicates with an automatic location identification provider, the location information database, or the additional data repository to receive at least a portion of the initial information.

6. The computer-implemented method according to claim 1, further comprising:
  receiving, by the PSDR with a link to an automatic location information (ALI) modem, an automatic number identification, a pseudo-automatic number identification, or other unique identification tag;
  relating, by the PSDR, the automatic number identification, the pseudo-automatic number identification, or the other unique identification tag to the caller data; and
  communicating, by the PSDR, the automatic number identification, the pseudo-automatic number identification, or the other unique identification tag to the call handling equipment.

7. The computer-implemented method according to claim 6, further comprising receiving, by the PSDR, a request for location data from the call handling equipment, the request for the location data comprising the automatic number identification, the pseudo-automatic number identification, or the other unique identification tag.

8. The computer-implemented method according to claim 7, further comprising translating, by the PSDR, data from at least one of the additional data repository, the location information database, and the cloud-based repository such that the call handling equipment, computer aided dispatch system, and logging system can read the translated data.

9. The computer-implemented method according to claim 7, wherein, in response to the call handling equipment requesting the location data by sending the automatic number identification to the PSDR, the PSDR requests the location data from the ALI modem and the cloud-based repository, and
  i.) in response to the PSDR not receiving the location data from the cloud-based repository within a predetermined period of time, the PSDR sends the location data received from the ALI modem to the call handling equipment, or
  ii.) in response to the PSDR receiving the location data from the cloud-based repository before receiving the location data from the ALI modem, the PSDR sends the location data from the cloud-based repository and prepares queued location data from the ALI modem.

10. The computer-implemented method according to claim 7, wherein, in response to the call handling equipment requesting the location data by sending the pseudo-automatic number identification to the PSDR, the PSDR requests the location data from the ALI modem and the cloud-based repository, wherein the PSDR sends the location data received from the ALI modem to the call handling equipment, and wherein the PSDR prepares queued location data from the cloud-based repository.

11. The computer-implemented method according to claim 9, wherein the call handling equipment requests the queued location data from the PSDR after step (ii.), and wherein the PSDR sends the queued location data to the call handling equipment.

12. The computer-implemented method according to claim 10, wherein the call handling equipment requests the queued location data from the PSDR, and wherein the PSDR sends the queued location data to the call handling equipment.

13. The computer-implemented method according to claim 1, further comprising, in response to the cloud-based repository receiving alarm data from a third party alarm monitoring system:
  receiving, by the PSDR, the alarm data from the cloud-based repository;
  communicating, by the PSDR, the alarm data to the computer aided dispatch system; and
  establishing, by the PSDR, a two-way communication channel between a dispatcher and the third party alarm monitoring system.

14. The computer-implemented method according to claim 1, wherein the cloud-based repository is programmed and/or configured to communicate with a plurality of PSDRs comprising the PSDR.

15. The computer-implemented method of claim 1, wherein the caller initiates communication with the call handling equipment as a video call, a voice call, a text message, an email, or other electronic communication.

16. A system for accessing data about a caller from multiple data sources in real time, the system comprising:
  a public safety data router (PSDR) programmed and/or configured to:
    connect to a cloud-based repository, wherein a connection between the PSDR and the cloud-based repository is executed through a network;
    request, through the network, configuration data from a device associated with the cloud-based repository;
    receive the configuration data from the device associated with the cloud-based repository;
    configure, based on the configuration data, communication settings of the PSDR to allow the PSDR to communicate with the cloud-based repository;
    after configuration of the communication settings of the PSDR and in response to a communication being initiated by the caller:
      request initial information from an automatic location information (ALI) modem, causing the ALI modem to access the initial information from a location information database;
      receive the initial information from the ALI modem, wherein the PSDR receives and reconfigures the initial information from an inbound format to a different outbound format such that the data is readable to call handling equipment; and
      in response to the ALI modem receiving the initial information from the location information database, communicate the initial information to the call handling equipment;
    request additional information from a cloud-based repository;
    receive the additional information from the cloud-based repository; and
    communicate the additional information to at least one of the call handling equipment, a computer aided dispatch system, and a logging system.

17. The system according to claim 16, wherein the PSDR is further programmed and/or configured to translate received data from at least one of an additional data repository, the location information database, and the cloud-based repository such that the call handling equipment, the computer aided dispatch system, and the logging system can read the received data.

18. The system according to claim 16, wherein the PSDR is further programmed and/or configured to:
  receive alarm data from a third party alarm monitoring system via the cloud-based repository; and
  communicate the alarm data to the computer aided dispatch system and establish a two-way communication channel between a dispatcher and the third party alarm monitoring system.

19. A computer program product for accessing data about a caller from multiple data sources in real time, the computer program product storing program instructions configured to cause at least one processor of a public safety data router (PSDR) to:
- connect to a cloud-based repository, wherein a connection between the PSDR and the cloud-based repository is executed through a network;
- request, through the network, configuration data from a device associated with the cloud-based repository;
- receive the configuration data from the device associated with the cloud-based repository;
- configure, based on the configuration data, communication settings of the PSDR to allow the PSDR to communicate with the cloud-based repository;
- after configuration of the communication settings of the PSDR and in response to a communication being initiated by the caller:
  - receive caller data comprising a unique caller identifier associated with the caller from the call handling equipment;
  - communicate, based on the unique caller identifier, a request for initial information to a location information database and/or an additional data repository;
  - receive the initial information;
  - reconfigure the initial information from an inbound format to a different outbound format such that the initial information is readable by at least one of the call handling equipment, a computer aided dispatch system, and a public safety information management system; and
  - communicate the initial information to at least one of the call handling equipment, the computer aided dispatch system, and the public safety information management system;
  - communicate, based on an index or search criteria, a request for additional information to the cloud-based repository;
  - receive the additional information from the cloud-based repository; and
  - communicate the additional information to at least one of the call handling equipment, the computer aided dispatch system, and the public safety information management system for display to a user.

20. The computer program product of claim 19, wherein the program instructions are further configured to cause the at least one processor of the PSDR to, before the communication being initiated by the caller:
- connect to the cloud-based repository, wherein the connection between the PSDR and the cloud-based repository is executed through a public safety agency network;
- request, through the public safety agency network, the configuration data from a cloud-based management platform of the cloud-based repository;
- receive the configuration data; and
- configure, based on the configuration data, the communication settings of the PSDR to allow the PSDR to freely download data from and upload data to the cloud-based repository.

* * * * *